UNITED STATES PATENT OFFICE.

PAUL THOMASCHEWSKI, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ANTHRAQUINONE DERIVATIVE.

No. 875,390.     Specification of Letters Patent.     Patented Dec. 31, 1907.

Application filed September 25, 1907. Serial No. 394,555.

*To all whom it may concern:*

Be it known that I, PAUL THOMASCHEWSKI, doctor of philosophy, chemist, citizen of the German Empire, residing at Elberfeld, Germany, Kingdom of Prussia, have invented new and useful Improvements in Anthraquinone Derivatives, of which the following is a specification.

My invention relates to the production of new anthracene derivatives. They can be obtained by condensing aminoanthrapyridons with halogen substituted anthrapyridons or with halogen substituted anthraquinones or by condensing halogen substituted anthrapyridons with aminoanthraquinones and they yield with the exception of the condensation product from 4-amino-1-anthrapyridon and 4-bromo-1-anthrapyridon on treatment with alkaline reducing agents vats suitable for dyeing and printing vegetable fibers. They can also be converted into sulfonic acids and are then all suitable for dyeing wool from an acid bath. The sulfonic acids with the exception of the one obtained from the condensation product of 4-amino-1-anthrapyridon with 4-bromo-1-anthrapyridon are also capable of forming "vats" suitable for dyeing and printing but the shades obtained from them are bluer in tint.

The new condensation products are dark powders soluble in hot quinolin and in concentrated sulfuric acid; dyeing in the shape of their sulfonic acids wool from acid baths from orange to red and blue shades.

The invention is illustrated by the following examples, the parts being by weight:

Example I.—A mixture of 150 parts of 4-bromo-1-anthrapyridon (obtainable by treating 1-acetylmethylamino-4-bromoanthraquinone with alkali according to the process described in United States Patent 853041), 100 parts of 2-aminoanthraquinone, 100 parts of calcium hydroxid, 5 parts of chlorid of copper and 2000 parts of naphthalene is boiled for three hours. The product separated in the melt is filtered off with suction on a hot filter, washed successively with alcohol, dilute hydrochloric acid and water. The product is then further purified by crystallization from anilin. It has the formula:

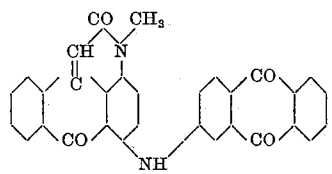

It is after being dried and pulverized a brown powder soluble in hot quinolin with a crimson red color and in concentrated sulfuric acid with a violet color. It forms an orange vat with alkaline hydrosulfite which vat dyes cotton fast red shades. Its sulfonic acid dyes wool from acid baths red shades.

Example II.—A mixture of 100 parts of 4-amino-1-anthrapyridon (obtainable by treating 1-acetylmethylamino-4-aminoanthraquinone with alkali), 100 parts of 4-bromo-1-anthrapyridon (obtainable by treating 1-acetylmethylamino-4-bromoanthraquinone with an alkali according to the process described in United States Patent 853041), 100 parts of anhydrous sodium acetate, 5 parts of chlorid of copper and 2000 parts of naphthalene is boiled for two hours. The new product separates in dark violet needles. It is filtered off with suction on a hot filter and washed with alcohol and water. The reaction which occurs is probably explained by the following formulæ:

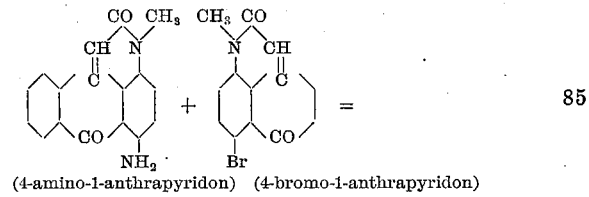

(4-amino-1-anthrapyridon)    (4-bromo-1-anthrapyridon)

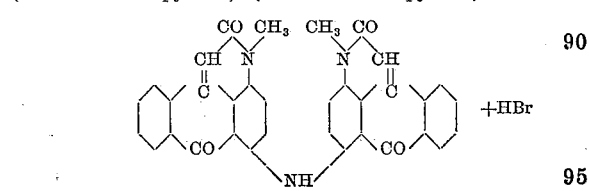

+HBr

The new product is soluble in concentrated sulfuric acid with a bluish-green color turning red on addition of water. It can be converted into a sulfonic acid dyeing unmordanted wool from an acid bath violet-blue shades.

The sulfonic acid can be prepared as follows: One part of the before described condensation product is dissolved with ½ part of boric acid in 10 parts of fuming sulfuric acid containing 40% of sulfuric anhydrid. The solution is heated to 90° C. and fuming sulfuric acid containing 80% of sulfuric anhydrid is gradually added until a test portion is completely soluble in dilute caustic soda. The sulfonic acid of the dyestuff is then precipitated by dilution of the melt with water and filtered off.

The process is carried out in a similar manner for the preparation of other of the above mentioned new compounds and for the production of the sulfonic acids therefrom.

In the following table the properties of some of the materials used for the production of the new dyestuffs are given.

| | Appearance. | Solution in pyridin | Solution in concentrated sulfuric acid. |
|---|---|---|---|
| 1) 1-acetylmethylamino-4-aminoanthraquinone. | Rusty-red crystalline powder. | Orange... | Slightly colored. |
| 2) anthrapyridon obtained from No. 1. (4-amino-1-anthrapyridon). | Greenish-leaflets. | Orange-red with a greenish yellow fluorescence. | Yellowish with green fluorescence. |
| 3) 1-acetylmethylamino-5-aminoanthraquinone. | Brownish red crystalline powder. | Orange-red. | Almost colorless. |
| 4) anthrapyridon obtained from No. 3. (5-amino-1-anthrapyridon). | Brown crystals. | Orange-yellow. | Brownish-yellow. |

In the following table the properties of some of the new dyestuffs are described:

| Condensation product from— | Appearance. | Solution in hot quinolin. | Solution in concentrated sulfuric acid. | Dyes unmordanted cotton from a "vat." | The sulfonic acid dyes wool. |
|---|---|---|---|---|---|
| 1-aminoanthraquinone+4-bromo-1-anthrapyridon.... | Dark brown prisms. | Red.......... | Violet........ | Reddish-violet. | Violet. |
| 2-aminoanthraquinone+4-bromo-1-anthrapyridon.... | Brown crystalline powder. | Crimson red.. | Violet........ | Red.......... | Red. |
| 5-amino-1-anthrapyridon+2-chloroanthraquinone.... | Brown crystals. | Orange........ | Green.......... | Orange........ | Orange. |
| 2.6-diamino-anthraquinone+4-bromo-1-anthrapyridon. | Brown crystalline powder. | Brownish-red. | Violet-red.... | Violet-red..... | Violet. |
| 1-oxy-4-aminoanthraquinone+4-bromo-1-anthrapyridon. | Dark-blue crystalline powder. | Blue.......... | Greenish-blue. | Violet........ | Blue. |
| 4-amino-1-anthrapyridon+4-bromo-1-anthrapyridon.. | Violet needles. | Violet........ | Bluish-green.. | .............. | Violet-blue. |

In order to illustrate the method of dyeing in the "vat" obtained from the above coloring matters the following example is given, the parts being by weight:

Example III.—Mix while continually stirring 20 parts of a ten per cent. paste of the condensation product obtained from 4-bromo-1-anthrapyridon with 2-aminoanthraquinone with 300 parts of water, add 15 parts of a solution of hydrosulfite of 20° Bé. and 8 parts of caustic soda (30 per cent. of NaOH) and heat the resulting mixture to 50° C. Enter 10 parts of cotton and dye in the "vat" for ¾ hour. Remove the goods, rinse and soap hot. A very fast red shade is thus obtained. The process for dyeing is carried out in the same way on using others of the above mentioned dyestuffs. They produce the shades as described in the table. The dyestuffs in an analogous way are used for printing on cotton from a suitably thickened vat.

Having now described my invention and in what manner the same is to be performed, what I claim as new, and desire to secure by Letters Patent, is:—

1. The herein-described new anthracene derivatives which can be obtained from anthrapyridons, which new derivatives are dark powders soluble in hot quinolin and in concentrated sulfuric acid, and which in the shape of their sulfonic acids dye wool from orange to red and blue shades, substantially as hereinbefore described.

2. The herein-described new anthracene derivative which can be obtained by condensing 2-amino-anthraquinone with 4-bromo-1-anthrapyridon, which new derivative is a brown powder soluble in hot quinolin with a crimson red color and in concentrated sulfuric acid with a violet color, forming a vat with hydrosulfite and causticsoda lye which dyes unmordanted cotton red shades, and dyeing in the shape of its sulfonic acid wool from acid baths red shades, substantially as described.

In testimony whereof I have hereunto set my hand in the presence of two subscribing witnesses.

PAUL THOMASCHEWSKI. [L. S.]

Witnesses:
  OTTO KÖNIG,
  WM. WASHINGTON BRUNSWICK.